United States Patent Office 2,986,279
Patented May 30, 1961

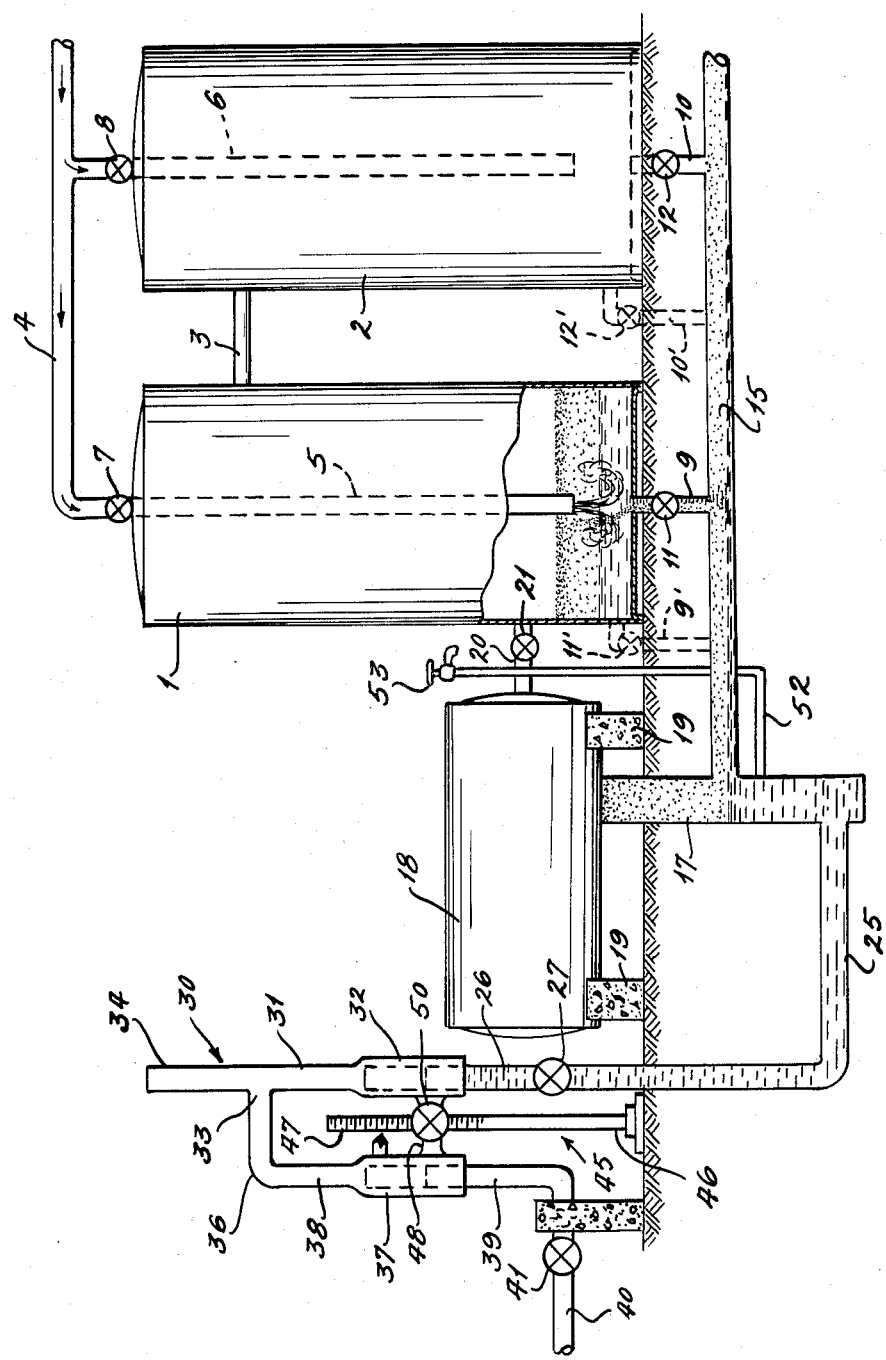

2,986,279

SEPARATION SYSTEM

Walter W. Henigman, 807 Ten Brooks, Paris, Ill.

Filed Mar. 18, 1960, Ser. No. 16,042

3 Claims. (Cl. 210—73)

This invention relates to a system for separating the components of a two-component system of immiscible liquids having different specific gravities. It has particular, but not exclusive, application to the separation of crude oil and water, and the invention will be described as applied to such separation.

Much of the oil obtained from wells is admixed with water when it is pumped from the well. Heretofore, various methods have been used to separate the oil from the water, which methods have included heating the oil-water mixture, adding chemicals which facilitate the separation, settling for extended periods in storage tanks, and various combinations of these methods. The first two have the disadvantage of being expensive and requiring considerable supervision; the third, is slow and inefficient.

One of the objects of this invention is to provide a system involving process and apparatus, for separating the components of a two-component system of immiscible liquids with different specific gravities, which is simple, inexpensive, requires little supervision, and which is more efficient than systems known heretofore.

Other objects will become apparent to those skilled in the art in the light of the following description and accompanying drawing.

In accordance with this invention, generally stated, a system for the separation of the components of a two-component system of immiscible liquids with different specific gravities is provided, which involves the use of at least one storage tank, a separator column connected to the storage tank by a conduit which lies at an angle no less than 90° from the vertical, measured from the storage tank in the direction of the separator column, and a heavy liquid discharge column so arranged that when the storage tank is filled with the lighter component, the discharge column is inoperative to discharge liquid, while, when the tank is occupied by both components, the heavy liquid discharge column can be adjusted to discharge liquid in response to the greater effective head of liquid in the tank.

An important feature of the system of this invention is the scrubbing or roiling of the entering liquid in the storage tank, when at least some of the heavier liquid has settled out at the bottom of the tank. To accomplish this, the storage tank is provided with a feed line having a discharge port directed downwardly and positioned below the vertical center of the tank. By this arrangement, since the mixture is introduced to the tank under pressure, the incoming mixture is forced at least partly below the surface of a pool of the heavier component which has settled out.

The construction of the drain conduit is such as to permit the lighter liquid, separated from the heavier in the separator column, to return to the storage tank through the drain conduit, even while the heavier liquid is flowing to the separator column through the same conduit.

The drawing shows a somewhat diagrammatic view of an illustrative embodiment of apparatus of this invention.

Referring now to the drawing, reference numerals 1 and 2 indicate storage tanks, connected by an overflow pipe 3. A feed header 4, connected to a well pump, not here shown, communicates with a feed line 5, extending through the top of the tank 1, and a feed line 6, extending through the top of the storage tank 2. While the storage tanks can be of any dimensions, their absolute dimensions forming no part of this invention, in the illustrative embodiment shown, the storage tanks 1 and 2 will be taken to be approximately twelve feet high, and the feed lines 5 and 6 extend from the top of the tanks to a point approximately two feet from the bottom. The lines 5 and 6 are open at their bottom ends. A valve 7 in the feed line 5 and a valve 8 in the feed line 6 permit the flow of liquid from the feed header 4 to be selectively directed into storage tank 1 or 2, or both.

Drain couplings 9 and 10 are connected with the tanks 1 and 2, respectively, at the bottom of those tanks. Alternatively, drain couplings 9′ and 10′ may be connected with tanks 1 and 2 respectively at the drain port which is customarily provided at or near the bottom of the side wall in oil storage tanks. While these ports are frequently positioned an inch or two above the very bottom of the tank, their position is still embraced within the expression "at the bottom of the tank" as used herein.

The drain couplings 9 and 10 (or 9′ and 10′) are connected with a drain conduit 15. Valves 11 and 12 (or 11′ and 12′) are positioned in the couplings 9 and 10 (or 9′ and 10′) respectively, between the tanks and the drain conduit, to permit the tanks selectively to be put into and cut off from communication with the drain conduit 15.

The drain conduit 15 opens into a separator column 17. The separator column 17 is connected at its upper end with a surge tank 18, resting on supports 19, on the surface of the ground. An overload return line 20, with a valve 21 in it, is shown as connecting the surge tank 18 with storage tank 1. Actually the overload return line is connected to all of the storage tanks in the system, but is generally put into communication only with the one being filled, and then only when the volume of liquid being pumped into the storage tank and its water content are both high.

A heavy liquid conduit 25 is connected with the separator column 17 below the connection of the drain conduit 15 with the separator column 17. The heavy liquid conduit 25 has a vertical leg 26 which forms a part of a heavy liquid discharge device 30.

The heavy liquid discharge device 30, in the embodiment shown, includes, besides the vertical leg 26, a sliding leg 31, connected in liquid-tight but slidable relation with the leg 26, by means of a packing gland 32. The leg 31 has a radially directed discharge opening 33 intermediate its ends. The section of the leg 31 above discharge opening 33 is open at its upper end, and serves both as a vent and as a stand pipe 34. The discharge opening 33, communicates with an inverted L shaped conduit 36, the downwardly extending stem 38 of which is parallel with the leg 31. The stem 38 of the conduit 36 is connected in slidable but liquid tight relation with a stationary discharge leg 39, by means of a packing gland 37. The discharge leg 39 forms a part of a discharge line 40, which can lead either to a storage container, if it is desired to save the heavy liquid, or to a disposal pit or the like, if it is not so desired. A valve 41 in the line 40 permits the discharge to be cut off.

Intermediate the leg 31 and the stem 38, is an adjusting device 45, shown somewhat diagrammatically in the drawing. The adjusting device 45, in this embodiment, includes a stand 46, which carries a calibrated scale 47, and an adjusting bracket 48, slidably mounted on the stand 46 for movement with respect to the scale 47. The bracket 48 is connected to the leg 31 and stem 38, and is movable up and down by means of a rack and pinion arrangement, not here shown, the pinion being manually operable by means of a hand wheel 50. The scale 47 is preferably graduated in terms of the specific gravity of the oil, in the illustrative embodiment shown, with the higher specific gravity vertically higher on the scale.

A sampler pipe 52 is connected with the separator column 17, below the drain conduit 15. The sampler pipe 52 has a cock or spigot valve 53 at its upper end, to permit the taking of samples from the lower end of the separator column.

The drain conduit 15 preferably has a definite downward pitch from the storage tanks to the separator column, as indicated in the drawing. It must not have a pitch in the opposite direction. In other words, the pitch of the drain conduit 15 must be at least 90° from the vertical measured from the storage tanks toward the separator column.

In order to illustrate the various parts of the apparatus of this invention more clearly, their relative sizes have been made disproportionate. As has been pointed out, the storage tanks 1 and 2 are normally at least twelve feet tall, and five or six feet in diameter. The feed header 4 and the feed lines 5 and 6 are commonly made up of two inch pipe. The drain conduit 15 can also be two inch pipe, although preferably, both the drain conduit and the drain couplings 9 and 10 are made of somewhat larger pipe, if the storage tanks can be adapted to receive the larger pipe. For example, four inch pipe may be used for the couplings and drain conduit. In the illustrative embodiment shown, the separator column 17 is made up of twelve inch pipe, at least five feet long, with its lower end sealed. Preferably, the separator column 5 extends at least five feet below the surface of the earth. The surge tank 18 can be about three feet in diameter and five feet long, and can be equipped for heating if desired. The overload return pipe 20 can be a two inch pipe. The sampler pipe 52 can be a half inch pipe. The heavy liquid discharge pipe 25, and the piping making up the adjustable discharge device 30 may all be two inch pipe, as can the discharge line 40. It can be appreciated that these dimensions are relative, and that for very large storage tanks or for a multiplicity of small storage tanks, larger piping, and a larger separator column would be necessary.

In operation, assuming that the valves 7 and 9 of storage tank 1 are open, and that valves 8 and 10 of storage tank 2 are closed, that both storage tanks are empty, and that pumping of a mixture of oil and water through header 4 is begun, the oil and water mixture will be pumped into storage tank 1, and flow by gravity into the drain conduit 15, thence, by gravity, to the separator column 17. Valve 21 and spigot 53 are closed, and valve 27 may be closed initially. As the filling of the storage tank 1 progresses (which ordinarily requires at least a full day's time), the oil and water separate, the water forming a pool in the bottom of the storage tank 1 and in the bottom of the separator column 17. When sufficient water has been accumulated, which can be determined in part at least from sampling through sample pipe 52, after the level of liquid in the storage tank is higher than the level of the spigot 53, the valve 27 may be opened, admitting water to the legs 26 and 31. It can be seen, that since the legs 26 and 31 contain water, which is invariably heavier than the oil component in the storage tank 1, the height of the discharge opening 33 can be so adjusted that, when the storage tank 1 is filled with oil to the level of the overflow pipe 3, no liquid will be displaced through the opening 33, but when, to the head of oil in the storage tank 1, there is added the weight of a layer of water in the tank, the water in the legs 26 and 31, which, together, make up the heavy liquid discharge column, will be displaced through the opening 33, until such time as the water layer in the storage tank 1 has either disappeared, or has been reduced to a certain predetermined level.

It has been found that the oil separating from the water in the separating column 17, below the opening of the drain conduit 15 into the separating column 17, is returned to the storage tank 1 through the drain conduit 15, even as water is flowing in the conduit 15 in the opposite direction, from the storage tank.

As the mixture of oil and water is pumped into the storage tank 1, after a water pool has formed in the bottom of the storage tank, the mixture is pumped through the surface of the water pool, which has been found to exert a kind of scrubbing action which has resulted in more efficient separation, rather than less, as would be expected from the stirring up of the water layer. When the level of liquid in the storage tank 1 has reached the overflow pipe 3, the liquid will then run into storage tank 2 through the overflow pipe 3. Valve 7 can be closed and valve 8 opened. It can be seen that if the heavy liquid discharge device 30 is properly adjusted, the settled water in storage tank 1 will be drained from the storage tank at least into the conector 9, drain conduit 15 or separator column 17. The valve 11 can than be closed and the valve 12 opened, and the process of filling and continuously separating can proceed with tank 2 in the same manner as it did with tank 1. While tank 2 is filling, tank 1 can be pumped off, so that when the liquid level reaches the overflow 3, storage tank 1 will be ready to receive the overflow.

It can be seen that the number of storage tanks can vary from one to as many as may be desired. If only one storage tank is used, a float or similar cutoff valve can be used to stop the flow of liquid to the storage tank when the level of liquid in the storage tank has reached a desired predetermined level. If three or more tanks are used, it is not necessary to pump off the full tank before the succeeding tank is filled. The size of the header 4 will be determined by the size of the storage tanks and the number of storage tanks which are to be filled simultaneously.

Numerous variations in the details of construction of various of the elements, within the scope of the appended claims, will be apparent to those skilled in the art in the light of the foregoing disclosure. For example, the adjusting mechanism of the heavy liquid discharge device can be of any desired character. Thus, a bracket can be welded to the fixed legs 26 and 39, and a vertical, threaded shaft welded thereto, with nuts above and below a bracket secured to the slidable part of the discharge device. The L-shaped conduit 36 can even be made of flexible tubing, in which case, an adjusting mechanism need be associated only with the "heavy liquid discharge column." These variations are only illustrative and not limiting.

Having thus described the invention, what is claimed and desired to be secured by Letters Patent is:

1. The method of separating components, continuously, from a mixture of two immiscible liquids having different specific gravities, comprising introducing said mixture into a storage tank sufficiently near the bottom thereof so that when a pool of the heavier liquid component has formed in the bottom, the mixture is forced at least part way beneath the surface of said pool, draining at least a part of the liquid in the bottom of the tank, by gravity, into a separator column through drain conduit means connected to the said tank and opening into said separator column, and simultaneously returning to said tank through said drain conduit means any of the lighter liquid separated within the separator column within the compass of the said drain conduit opening.

2. The method of claim 1 wherein a heavy liquid conduit means is connected to the separator column below the opening of the drain conduit means, said heavy liquid conduit means communicating with a heavy liquid discharge column, containing heavy liquid, and having a discharge opening the effective height of which, with respect to the tank, can be adjusted, and the method includes balancing the heavy liquid at the overflow level of the tank in such a way that light liquid in the tank balances the heavy liquid below the said discharge opening while heavy liquid in the tank causes the heavy liquid in the discharge column to overflow through the said discharge opening.

3. A liquid separation system in which components of a mixture of immiscible liquids are to be separated, comprising a storage tank; a feed line from a source of said mixture of immiscible liquids, to and extending within said tank and having a downwardly directed discharge port positioned within said tank below the vertical center of the said tank; a drain conduit communicating with the interior of said tank at the bottom of said tank and extending downwardly from said bottom; said drain conduit extending from said tank to and communicating with a vertical separator column, intermediate the ends of said column, said drain conduit between said tank and said separator column being set at an angle of not less than 90° from the vertical measured from the said tank in the direction of said separator column; a surge tank, communicating with the upper end of said separator column, said surge tank being positioned above the bottom of the storage tank; and a heavy liquid conduit communicating at one end with the interior of the separator column below the place of communication of the drain conduit with the separator column and at its other end with a heavy liquid discharge device having a vent to the atmosphere and a liquid discharge opening positioned above the said separator column and surge tank, and the effective height of which, with respect to the storage tank, can be adjusted.

References Cited in the file of this patent

UNITED STATES PATENTS

| | | |
|---|---|---|
| 1,496,090 | Marker et al. | June 3, 1924 |
| 2,423,793 | Olivo et al. | July 8, 1947 |
| 2,642,886 | Bell | June 23, 1953 |